Feb. 10, 1942.  T. A. BOWERS  2,272,632
PISTON RING CONSTRUCTION
Filed April 29, 1940   2 Sheets-Sheet 1
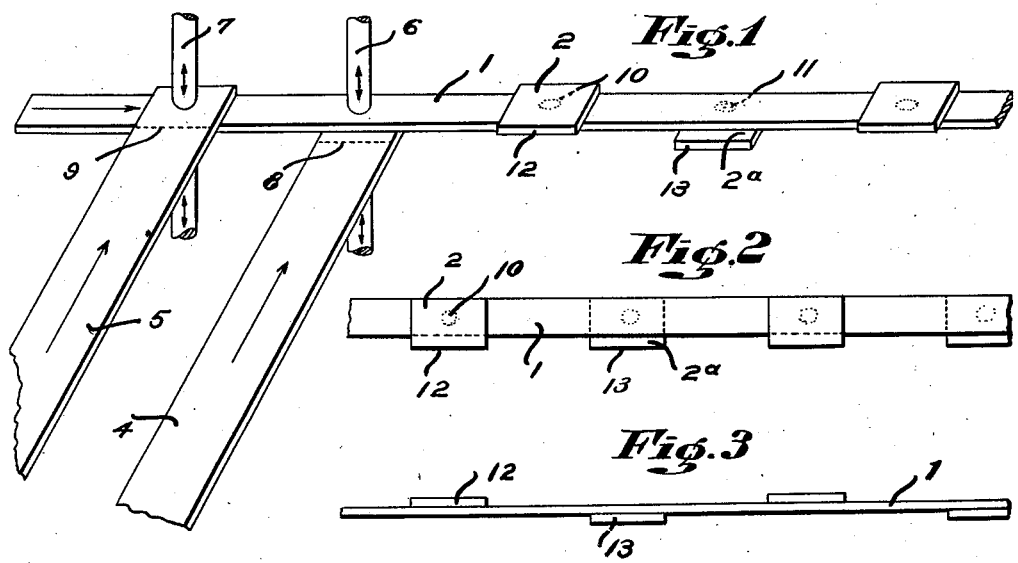
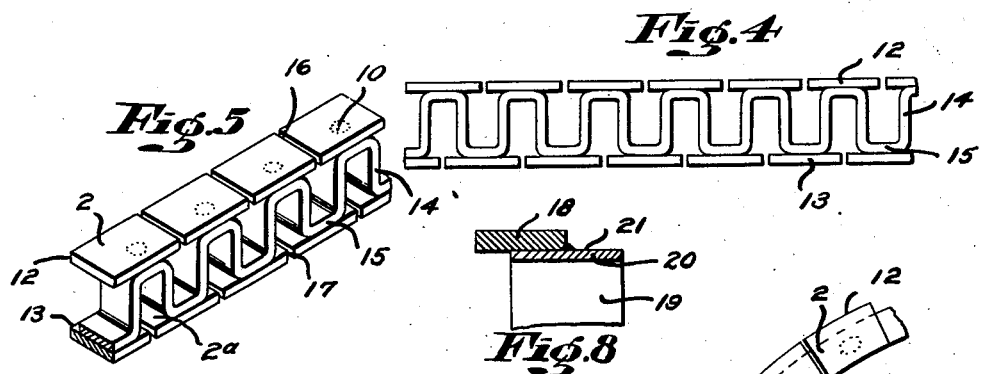
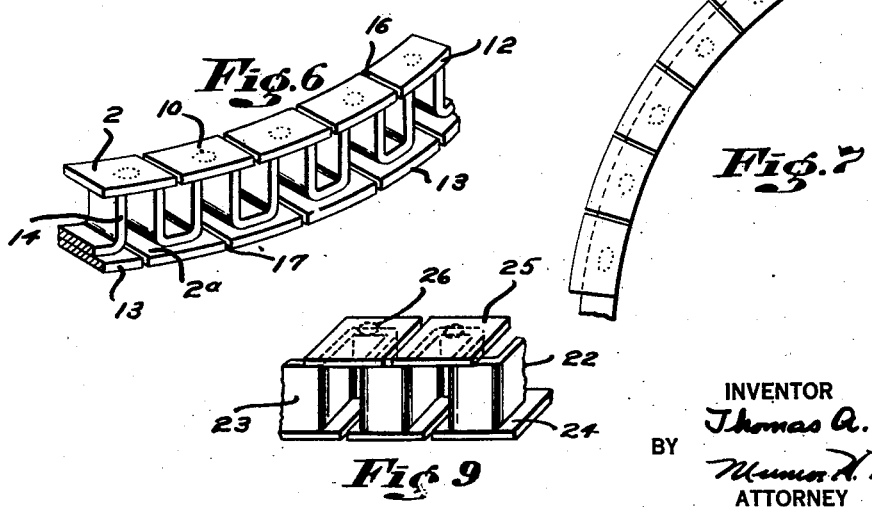
INVENTOR
Thomas A. Bowers
BY
Munson N. Hamilton
ATTORNEY Feb. 10, 1942. T. A. BOWERS 2,272,632
PISTON RING CONSTRUCTION
Filed April 29, 1940 2 Sheets-Sheet 2
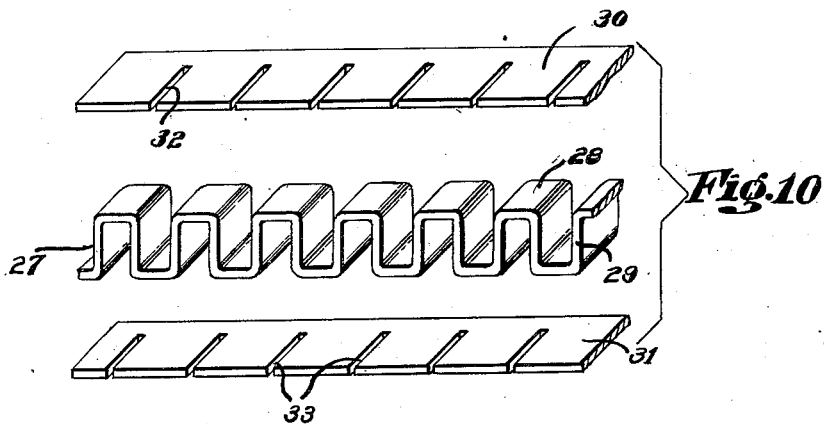
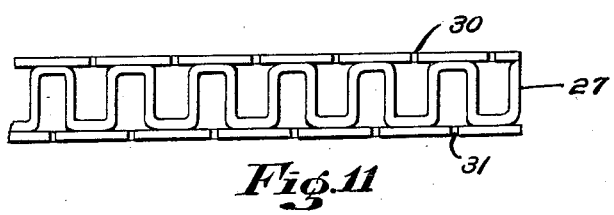
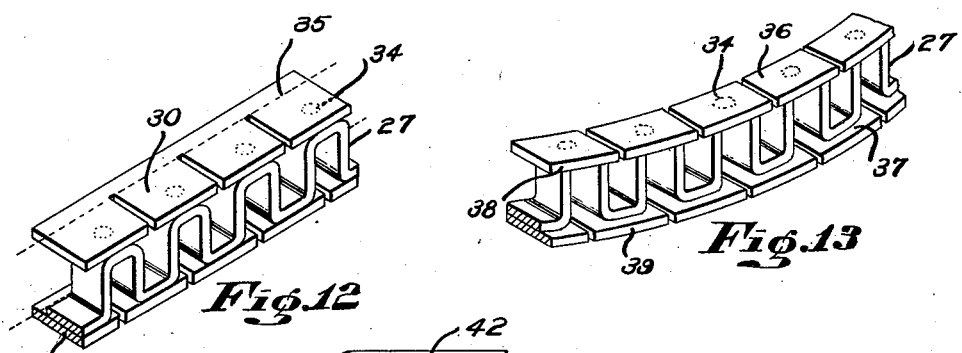
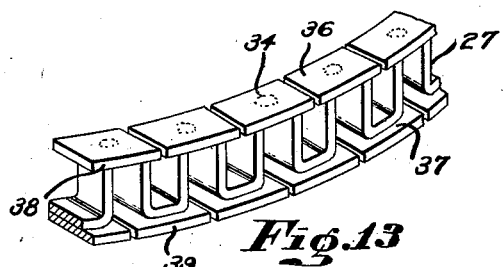
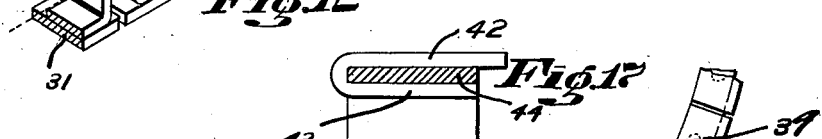
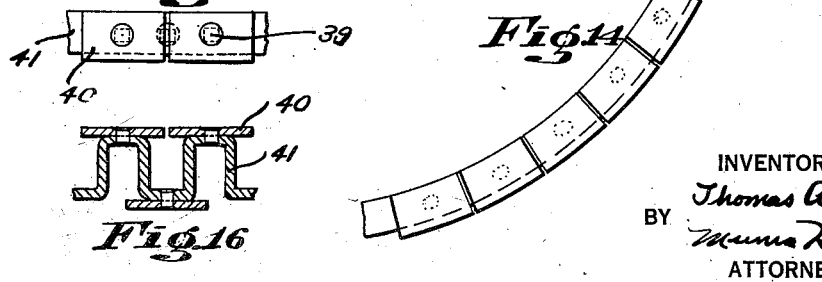
INVENTOR
Thomas A. Bowers
BY
ATTORNEY Patented Feb. 10, 1942

2,272,632

UNITED STATES PATENT OFFICE 2,272,632

PISTON RING CONSTRUCTION

Thomas A. Bowers, Boston, Mass., assignor to Power Research Corporation, Boston, Mass., a corporation of Massachusetts Application April 29, 1940, Serial No. 332,219

4 Claims. (Cl. 309—45)

This invention relates to piston rings and piston ring manufacture and is a continuation in part of my co-pending application Ser. No. 276,503, filed May 31, 1939.

A principal object of the invention is to improve piston rings and to devise ring constructions in which novel bearing surfaces are provided, and desirable combinations of materials are employed. The invention further aims to provide improved methods of making piston rings and particularly piston rings of the oil metering type. Still another object of the invention is to provide cheap, durable, light, and efficient piston ring constructions which are adapted to manufacture by conventional tool machinery.

Attainment of these and other objects of the invention will appear in the following description of the drawings and the discussion relating thereto.

In the accompanying drawings:

Figure 1 is a diagrammatic view illustrating a step in a method of forming strips of sheet material into a piston ring construction.

Fig. 2 is a fragmentary plan view illustrating another step in the method of making the ring of the invention.

Fig. 3 is a fragmentary view in side elevation further illustrating the strip assembly resulting from the step indicated in Fig. 2.

Fig. 4 is a fragmentary side elevational view illustrating still another step in the method of making the ring referred to.

Fig. 5 is a fragmentary perspective view of a ring construction resulting from the step indicated in Fig. 4.

Fig. 6 is another fragmentary perspective view illustrating a still further forming step in the method of making a piston ring.

Fig. 7 is a fragmentary plan view of a finished ring made in accordance with the procedure outlined.

Fig. 8 is a fragmentary cross sectional view of a modification of piston ring construction.

Fig. 9 is a fragmentary perspective view of another modified piston ring construction.

Figs. 10–14 inclusive illustrate a modified method of making a piston ring from sheet materials.

Fig. 15 is a plan view of another modified piston ring construction.

Fig. 16 is a fragmentary cross sectional view of a piston ring construction similar to that shown in Fig. 15; and Fig. 17 is a fragmentary cross sectional view of still another modified piston ring construction.

Referring in detail to the drawings, Figs. 1–7 inclusive illustrate a piston ring construction and one method of ring manufacture; Figs. 8 and 9 illustrate modified ring constructions; Figs. 10–14 inclusive indicate another method of making piston rings; and Figs. 15, 16 and 17 are illustrative of further modified piston ring constructions.

In the construction indicated in Figs. 1–7 inclusive, 1 indicates a sheet material employed in making the rings of the invention. The sheet is of a resilient character and may be spring steel, alloy, or other metal or material. A development in piston ring construction is to form a sheet material of the resilient character noted into reversely folded ring bodies as described in the co-pending application above referred to. These reversely folded rings are characterized by pronounced flexibility and compressibility, constituting a definite advance in the art.

According to the present invention, a strip of the resilient material is reversely bent to provide a ring of the same general flexible character described. Thereafter, pieces or segments of piston ring material are attached to the ring to serve as bearing surfaces and in particular oil scraping edges. As illustrated in Fig. 1, the segments 2 and 2a are attached at the top and bottom sides of the strip in an alternate manner. One method of attachment consists in advancing strips of piston ring material such as 4 and 5 in a direction at right angles to the direction of movement of the strip 1 as shown at the lefthand side of Fig. 1. Predetermined lengths of the strips 4 and 5 are allowed to extend across the strip 1 and these extending portions are attached or connected to the strip 1 by some suitable means as, for example, welding, as has been diagrammatically illustrated by the welding members 6 and 7.

After welding has been carried out, the attached portions of the strips 4 and 5 are cut off, as for instance along dotted lines 8 and 9. The result of these operations is to provide segments attached to the strip 1 by weldings 10 and 11, with the segments or pieces of piston ring material presenting edges 12 and 13 which project beyond the strip.

The segment and strip assembly is reversely folded upon itself in the manner illustrated in Fig. 4. There are thus formed webs 14 and bends 15 with the connected segments becoming arranged adjacent one another at the top and bottom of the folded structure to form top and bottom bearing surfaces, having interstices 16 and 17 as shown in Fig. 5.

A length of the attached segment material suitable for constituting a desired piston ring diameter is formed into an annular body as illustrated in Fig. 6. Thereafter the annular body may be subjected to various finishing operations, such as grinding, hardening and the like, to provide a completed ring as disclosed in Fig. 7.

The forming operations may be effected by apparatus of the type commonly referred to as "tool machinery." For example, the cutting operations may be effected by conventional punch mechanism or by cutting or shearing dies, and folding of the material may be carried out with conventional forming dies or press mechanism. Forming a straight length of folded material into a circular body can be effected in several ways, one example of which is to force a length of the material through an annular rack or die.

In the ring shown, there is provided an annular supporting structure made up of the folds or web portions 14 and bends 15. The segments or pieces of piston ring material 2 and 2a form interrupted top and bottom sides or "land surfaces" which are adapted to seat the ring in a ring groove. The supporting structure is characterized by circumferential compressibility and extensibility obtained from arranging folds of resilient metal in spaced relation, and by arranging the segments 2 at the top side of the ring and the segments 2a at the bottom side of the ring also in spaced relation.

The contiguous arrangement of the segments forms upper and lower projecting circumferential edges as shown in Figs. 6 and 7, and these edges are highly adapted to functioning as oil metering members. In each of the circumferential edges thus formed there occur interstices 16 and 17 with the interstices 16 of the upper edge occurring in staggered relation with respect to the interstices 17 of the lower edge, so that a substantial sealing of one edge by another is obtained. Either one, as well as both of the edges, may be utilized for oil scraping as for example by attaching segments only at the top side of a supporting structure.

It is customary in some instances to form a piston ring of a steel that is easily bent, and then harden the ring. The usual practice in hardening consists in heating the ring, then cooling in oil or water, and then reheating. In carrying out these operations, difficulty may arise in properly supporting the ring without deforming it while it is in a heated state.

The ring of the invention avoids this difficulty, due to its being formed of two or more piston ring materials. This is effected for example by employing a flexible steel or other metal for the strip 1 to form a supporting structure, and by utilizing a steel or other metal which has been hardened for the strips 4 and 5 to form bearing surfaces of the ring. Hardened steel is adapted to cutting operations necessary in forming the segments described, and by thus employing sheet material of different hardnesses, special hardening operations are avoided. In addition, piston ring material in the strip form is very efficiently hardened by disposing the strip in spiralled relation on a suitable support.

In addition to hardening the ring, it may be found desirable to improve its seating surfaces for contact with a piston groove. One excellent means of effecting this is to grind the sides into a desired form. Grinding operations may be objectionable due to the bends 15 of the supporting structure becoming weakened from portions of the material being ground away. It is pointed out that the ring construction of the invention provides additional thicknesses of piston ring material which can be ground to any desired extent, without weakening of the bends of the supporting structure. At the same time, less care is required in carrying out the grinding operation and more efficient grinding tools may be employed.

The strips of piston ring material may also differ from one another in other ways. For instance, change in the thickness of segments or pieces of piston ring material which form the bearing surface of a ring on a cylinder may be employed to modify the unit wall pressure of the ring. Increase in unit wall pressure occurs with decrease in thickness of the bearing edges and correspondingly decrease in unit wall pressure is effected by increasing the thickness of these edges.

In operation, the ring functions as a gapless ring with edges adapted to abut one another. By its circumferential compressibility and consequent extensibility, the ring engages the wall of a cylinder at all points, conforming to any non-uniform worn areas in the cylinder and exerting a substantially uniform pressure throughout its contact with the cylinder. It should be noted that the ring retains its extensible character without the use of any expanding means disposed between the back of the ring and its ring groove. As a result there is less transfer of piston slap and a reduction of wear which ordinarily develops therefrom.

A number of advantages are obtained from the ring construction and its manufacture as described. There is made available a one-piece light ring of circumferential and radial extensibility and compressibility, having incorporated therein projecting circumferential portions which are well adapted to act as oil metering members. This one-piece ring construction compares very favorably with conventional oil ring assemblies such as those composed of a spacing ring, upper and lower steel scraping rings, and an expander member. It is pointed out that the projecting circumferential edges take the place of separate upper and lower scraping rings of the conventional assembly referred to, and the reversely folded supporting structure acts as both a spacing member and expanding member. Also, these desirable effects are achieved with there having been provided desirable means for allowing oil collected by the ring to be quickly and efficiently passed to the back of the piston ring groove.

Another advantage of the invention is in the cheapness of the materials and the method employed in forming a ring such as that described. The forming operations are adapted to being carried out with conventional tool machinery of the type above outlined, which provides cheap and efficient production. The low cost of resilient sheet materials such as those of steel, together with these methods, makes possible the production of rings at substantial savings.

The steps illustrated in Figs. 1–7 have been shown in connection with strips of materials, each of which are substantially the same thickness. However, it is intended that such operations may be effected upon material occurring in other forms as in sheet form or in a roll. The strips of material may be further formed with a variable cross section, for example, to effect greater strength at some points in a ring than at others, and a plurality of strips or sheets may be desired to be employed. The cutting or forming operations may be modified to occur angularly of the material or in other ways. Also, the cutting or forming operations may be desired to be effected at other stages in the method of making the ring. The operations described may be resorted to in different sequence and for various other purposes, as for instance in the manufacture of expander rings or other types of sealing members in reciprocating bodies.

Fig. 8 illustrates one modification of ring construction in which segments 18 are attached to the folded strip 19 in the manner already described. In this instance, the segment 18 is of a size such that it extends only part way across the bends 20 of the folded strip 19. The result is a relieved inner crown surface 21 which may be desirable to prevent extrusion of oil, and for other purposes.

I may desire to arrange the segments in still other ways. For instance, the segments may be disposed so that their edges which are to bear against a cylinder wall are flush with the edges of the supporting structure. An arrangement of segments in this way is illustrated at the front side of the structure shown in Fig. 5. In forming a ring from a structure of this character, the flush edges would constitute the outer periphery of the ring instead of its inner periphery as shown in Fig. 7.

Fig. 9 fragmentarily indicates another modification of ring construction and is more particularly illustrative of other types of supporting structures with which segments may be associated. A strip 22 of piston ring material is folded with the lines of folding occurring vertically of the ring to present upstanding portions 23 upon which segments 24 and 25 are attached in some suitable manner as by welding indicated by numeral 26. Other types of supporting structures may be employed, as for example those of a longitudinally folded strip character as described and claimed in my co-pending application Ser. No. 327,279, filed April 11, 1940.

Another method of securing pieces or segments of piston ring material to a compressible ring structure has been illustrated in Figs. 10-14 inclusive. In this method, a strip of piston ring material 27 is reversely folded as before to provide bends 28 and connecting web portions 29. Upon this supporting structure are located strips of piston ring material 30 and 31, formed with cuts or slots 32 and 33 extending transversely and part way across the strips as illustrated in Figs. 11 and 12. The strips 30 and 31, at points between the cuts 32 and 33, are secured to the bent portions of the supporting strip 27 in some suitable manner as by welding 34. Thereafter, those portions of the strip 30 and 31 which are not intersected by the slits 32 and 33 are cut away in some suitable manner, as for example by grinding along the dotted line 35 as illustrated in Fig. 12. This provides a structure, similar to that illustrated in Fig. 2, which is adapted to be formed into an annular body having top and bottom segments or pieces 36 and 37 forming edges 38 and 39 respectively. As before, the ring is subjected to finishing operations such as grinding and hardening to provide a completed ring as shown in Fig. 14. I may also provide the slotted strips 30 and 31 in a ring shape, in which case they are fastened in the manner just described but do not require separate forming to provide an annular body.

In addition to the welding operation illustrated in Fig. 1 as a means of fastening or attaching the pieces to a supporting structure, I may employ other fastenings. Fig. 15 discloses segments 40 which are secured to a supporting structure 41 by means of rivets 39. It will be noted that the rivets when employed for this purpose will be counter-sunk to occur below the surfaces of the segments 40, as is more clearly illustrated in Fig. 16. Fig. 17 discloses still another method of attachment of segments. 42 denotes a segment provided with a tab portion 43 which is adapted to be folded around and clinched to a bend 44 of a supporting structure 45. Various other methods of assembly and attachment of pieces or segments of piston ring material may be desired to be employed, as for instance, the crown pieces may either be secured to, or extend over, two or more of the bends of a reversely folded supporting structure, or the segments may be attached to a conventional cast iron C-type ring. Where a segment or crown piece extends over two bent portions, it may serve to seal the opening between them.

It will be seen that novel bearing surfaces generally and oil metering edges in particular have been provided in a sheet metal piston ring. The use of two or more piston ring materials of different character has been embodied in a ring structure and the ring beneficially modified. Certain hardening operations have been simplified or eliminated and grinding operations where desired made more feasible. Cheap, simple and efficient methods of making piston rings are set forth which are well adapted to being carried out with conventional tool machinery, and there are generally made available improved and strengthened piston ring constructions.

While I have shown preferred embodiments of the invention, it should be understood that various changes in methods and constructions may be resorted to, in keeping with the spirit of the invention as defined by the appended claims.

Having described my invention, I claim:

1. A piston ring construction comprising a strip of resilient sheet material bent to provide a circumferentially compressible annular body having crowns and connecting web portions, a plurality of pieces of a second piston ring material connected to the crowns at the top and bottom sides of the body, said pieces of piston ring material extending circumferentially beyond the web portions and occurring in minutely spaced-apart relation to present an annular seating surface for the ring.

2. A piston ring construction comprising a strip of resilient sheet metal formed into an annular body, and attached thereto pieces of piston ring material arranged in contiguous relation to form a bearing surface of the ring, said pieces of piston ring material being of a temper substantially harder than that of the said strip.

3. A piston ring construction comprising an annular supporting structure made up of one piston ring material reversely bent upon itself to provide crowns and webs, and a plurality of segments made up of a piston ring material of a different hardness than the said first piston ring material attached to the crowns, said pieces occurring in contiguous relation at the top and bottom sides of the ring and projecting radially and circumferentially beyond the webs to provide combined annular seating surfaces and spaced-apart oil scraping edges.

4. As an article of manufacture a piston ring comprising a flexible supporting ring formed from a strip of resilient sheet material reversely folded to present upper and lower bent portions and spaced-apart connecting web portions, upper and lower annular rows of segments of a different piston ring material, said segments being separately attached throughout a portion only of their circumferential width to the bent portions, said segments being of a thickness greater than the bent portions and extending radially beyond the bent portions and web portions to form projecting edges for metering oil on a cylinder wall.

THOMAS A. BOWERS.